United States Patent Office
3,510,505
Patented May 5, 1970

3,510,505
2 - SUBSTITUTED AMINOMETHYLCYCLOOCTYL AMIDES OF ALKYL SUBSTITUTED ACETIC ACID
Edward J. Pribyl, Metuchen, and Jack Bernstein, New Brunswick, N.J., assignors to E. R. Squibb & Sons, Inc., New York, N.Y., a corporation of Delaware
No Drawing. Application Mar. 7, 1967, Ser. No. 621,143, now Patent No. 3,373,195, which is a continuation-in-part of application Ser. No. 323,880, Nov. 15, 1963, which in turn is a continuation-in-part of application Ser. No. 72,328, Nov. 29, 1960. Divided and this application Sept. 20, 1967, Ser. No. 669,267
Int. Cl. C07c 103/86
U.S. Cl. 260—557
6 Claims

ABSTRACT OF THE DISCLOSURE

This invention relates to basic amides having the general formula

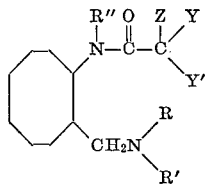

the meaning of the symbols being explained below, and salts of compounds of this formula. These substances have central nervous system stimulant activity and are useful as psychomimetic agents.

---

This application is a division of application Ser. No. 621,143, filed Mar. 7, 1967 now U.S. Pat. 3,373,195, which is a continuation-in-part of application Ser. No. 323,880, filed Nov. 15, 1963, now U.S. Pat. 3,322,776, which, in turn, is a continuation-in-part of application Ser. No. 72,328, filed Nov. 29, 1960, now abandoned.

This invention relates to compounds represented by the formula (I) 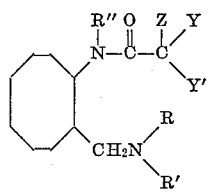

wherein R and R' each represents hydrogen, lower alkyl, phenyl-lower alkylene or join to form with the nitrogen atom to which they are attached a nitrogen-containing heterocyclic of less than 12 atoms in the group, R" represents hydrogen or lower alkyl, Y and Y' each represents phenyl, substituted phenyl or 3 to 6 carbon cycloalkyl, and Z represents hydrogen, hydroxy or lower alkoxy, and salts of said compounds.

In Formula I above, the lower alkyl groups occurring in substituents represented by the symbols R, R' and R" include straight chain and branched chain aliphatic hydrocarbon groups such as methyl, ethyl, propyl, isopropyl, butyl, isobutyl, t-butyl, amyl and the like. The phenyl-lower alkylene groups include, for example, benzyl, phenethyl, α-methylphenethyl and the like.

In addition to representing lower alkyl groups of the character described above, R and R' may be joined in a 4 to 6 membered saturated chain containing all carbon atoms or a sulfur, an oxygen or one additional nitrogen atom and the rest carbon atoms so that the group

also represents 5-, 6- or 7-membered monocyclic tertiary amino heterocyclics and substituted heterocyclics of less than 12 atoms such as piperidino, (lower alkyl)piperidino, e.g., methylpiperidino, di(lower alkyl)piperidino, e.g., dimethylpiperidino, (lower alkoxy)piperidino, e.g., methoxypiperidino, pyrrolidino, (lower alkyl)pyrrolidino, e.g., methylpyrrolidino, di(lower alkyl)pyrrolidino, e.g., dimethylpyrrolidino, (lower alkoxy)pyrrolidino, e.g., ethoxypyrrolidino, morpholino, (lower alkyl)morpholino, e.g., 2-methylmorpholino, di(lower alkyl)morpholino, e.g., 2,3 dimethylmorpholino (lower alkoxy) morpholino, e.g., ethoxymorpholino, thiamorpholino, (lower alkyl) thiamorpholino, e.g., 2-methylthiamorpholino, di(lower alkyl)thiamorpholino, e.g., 2,3 - dimethylthiamorpholino, (lower alkoxy)thiamorpholino, e.g., 2 - methoxythiamorpholino, piperazino, (lower alkyl)piperazino, e.g., N⁴-methylpiperazino, 2-methylpiperazino or 3-methylpiperazino, di(lower alkyl)piperazino, e.g., 2,3-dimethylpiperazino, hexamethyleneimino and homopiperazino.

Substituted phenyl groups represented by the symbols Y and Y' include such substituents as halophenyl, in which any of the four halogens may be present, e.g., fluorophenyl, chlorophenyl, bromophenyl, iodophenyl, dichlorophenyl, dibromophenyl and the like, lower alkyl phenyl, e.g., tolyl, xylyl and the like, lower alkoxyphenyl, e.g., methoxyphenyl, ethoxyphenyl, dimethyloxyphenyl and the like. Y and Y' also represent alicyclic hydrocarbon groups containing 3 to 6 carbon atoms, i.e., cyclopropyl, cyclobutyl, cyclopentyl and cyclohexyl. The lower alkoxy groups represented by Z include for example, methoxy, ethoxy, propoxy, isopropoxy, butoxy and the like.

The groups represented by R and R' and by Y and Y' may be the same or different in any given compound.

Compounds of the above description are produced by first reacting a basically substituted cyclooctylamine with a 2,2-disubstituted acetyl halide having the formula (II) 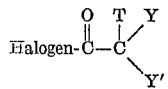

wherein T represents hydrogen or halogen and Y and Y' have the same significance as defined above.

When the symbol T in Formula II represents hydrogen, e.g., the reactant is diphenyl acetyl chloride, a product of Formula I wherein Z represents hydrogen is obtained. When T represents a halogen, e.g., the reactant is α-chlorodiphenyl acetyl chloride, a halogenated product results which, upon treatment with water, yields a compound of Formula I wherein Z represents hydroxy or, upon reaction with a lower aliphatic alcohol such as methanol, ethanol or the like, yields a compound of Formula I wherein Z represents alkoxy.

When the symbol R" in Formula I above represents the lower alkyl group, the substituted cyclooctylamine is first alkylated, e.g., by reaction with formaldehyde, acetaldehyde or the like, then with a reducing agent such as lithium aluminum hydride. The resulting substituted cyclooctylalkyl amine is then reacted with the substituted acetyl halide of Formula II in the same manner as described.

The basically substituted cyclooctylamine which reacts with the compound of Formula II may be derived from the corresponding basically substituted cyclooctanone by reacting the latter with hydroxylamine and then reducing the oxime produced, for example, with lithium aluminum hydride or by catalytic hydrogenation in the presence of ammonia. A method for introducing an alkyl group on the nitrogen has already been described.

The compounds of Formula I form acid addition salts with organic and inorganic acids. Such salts include for example, hydrohalides such as hydrochloride, hydrobromide, etc., other mineral acid salts such as nitrate, phosphate, sulfate, etc., or organic acid salts such as aromatic- and alkanesulfonates like benzenesulfonate, toluenesulfonate, methanesulfonate, etc., as well as acetate, tartrate, malate, citrate, ascorbate, salicylate, etc. The compounds of Formula I also form quaternary salts, for example with alkyl halides such as methyl chloride, ethyl chloride, methyl bromide, ethyl bromide, and the like, alkyl sulfates such as methyl sulfate and the like, aralkyl halides such as benzyl chloride, etc. All such salts are included within the scope of this invention.

The compounds of this invention exert a stimulating effect on the central nervous system and are useful as psychostimulants or antidepressants, e.g., for the relief of depression. They may be administered orally or parenterally to animal species in conventional dosage forms such as tablets, capsules, injectables or the like by incorporating the appropriate dose of the base or pharmacologically acceptable salt thereof with carriers, e.g., about 5 to 200 mg./day, according to accepted pharmaceutical practice.

The following examples are illustrative of the invention. All temperatures are expressed in degrees centigrade.

EXAMPLE 1

2-(dimethylaminomethyl)cyclooctanol

A solution of 20.5 g. (0.112 mole) of 2-(dimethylaminomethyl)cyclooctanone in 50 ml. of methanol is cooled to 0° and 2.0 g. (100% excess) of sodium borohydride is added portionwise over a period of 10 minutes with stirring and cooling. The resulting solution is allowed to warm gradually to room temperature as effervescence subsides. After remaining overnight at room temperature, the methanol is removed by distillation leaving a syrupy residue of 28 g. which is taken up in ether and filtered to remove an insoluble gelatinous solid. The ethereal solution is extracted with 5% aqueous hydrogen chloride, the aqueous acidic solution is cooled in an ice-water bath, layered over with ether, and solid potassium carbonate is added to saturation. The ethereal layer is removed via a separatory funnel and the alkaline aqueous layer is again extracted with ether. The combined ethereal solutions are dried over magnesium sulfate, filtered, and the ether removed by distillation leaving a residue of crude product weighing 20 g. The 2-(dimethylaminomethyl)cyclooctanol is purified by fractionation under reduced pressure resulting in a product distilling at 105–108° at 1.5 mm.

Benzilic acid ester of 2-(dimethylaminomethyl)- cyclooctanol

A solution of 5.6 g. (0.03 mole) of 2-(dimethylaminomethyl)cyclooctanol in 35 ml. of benzene is added dropwise with stirring to a solution of 8.0 g. (0.03 mole) of diphenylchloroacetyl chloride in 50 ml. of benzene at room temperature. During the 10 minute addition period the temperature rises spontaneously to 40°. After remaining at room temperature overnight, the reaction mixture is warmed to gentle reflux over a steam bath for 4 hours. The solvent is then removed by distillation under reduced pressure and the oily residue is triturated with ether. The ether is then decanted. The residue is taken up in 100 ml. of water and warmed at 70–80° for 30 minutes on a steam bath. The oil separating from solution redissolves when the cooled reaction mixture is diluted with an additional 100 ml. of water plus 20 ml. of 2% aqueous hydrogen chloride. The acidic aqueous solution is washed with ether, then layered over with ether, cooled in an ice-water bath and solid potassium carbonate is carefully added to saturation. The ethereal layer is removed and the alkaline aqueous layer again extracted with ether. After drying the combined ethereal solutions over magnesium sulfate and filtration, the ether is removed by distillation leaving a semi-solid residue which is triturated with hexane and filtered by suction to give a yield of 5.5 g. of white solid with a melting point of 132–4°. The benzilic acid ester of 2-(dimethylaminomethyl)cyclooctanol is purified by recrystallization from acetonitrile and melts at 133–4°.

EXAMPLE 2

Benzilic acid ester of 2-(dimethylaminomethyl)cyclooctanol hydrochloride

The hydrochloride is formed by cooling a solution of 4.0 g. (0.01 mole) of the benzilic acid ester of 2-(dimethylaminomethyl)cyclooctanol in 400 ml. anhydrous ether in an ice-water bath and adding dropwise with stirring to the cool solution one equivalent (0.36 g.) of hydrogen chloride in ethanol. A gum separates from solution which readily crystallizes to a white solid which is recovered by suction filtration, washed with ether, and dried in a vacuum desiccator to give a yield of product weighing 4 g. with a melting point of 206–208° (d.). It may be recrystallized from acetonitrile-ether solution.

EXAMPLE 3

2-(dimethylaminomethyl)cyclooctanone oxime

A solution of 20.5 g. (0.2 mole) of 2-(dimethylaminomethyl)cyclooctanone and 14.0 g. (0.2 mole) of hydroxylamine hydrochloride in 80 ml. of absolute ethanol is warmed at reflux temperature for 3 hours. After remaining overnight at room temperature, the ethanol is removed by distillation under reduced pressure and the resulting crystalline solid residue is cooled, triturated with ether, and then taken up in 200 ml. of cold water and made acid to Congo red indicator paper with 2% aqueous hydrogen chloride. The aqueous solution is washed with ether, cooled, layered over with ether and made alkaline by the addition of solid potassium carbonate. The ethereal layer is removed via a separatory funnel and the alkaline aqueous layer is extracted again with ether. The combined ethereal layers are dried over magnesium sulfate, filtered and the ether removed by distillation leaving a residue of crude product weighing 20 g. which is purified by fractionation under reduced pressure to give the product, distilling at 124–126° at 0.1 mm. The distillate solidifies on standing at room temperature giving 2-(dimethylaminomethyl)cyclooctanone oxime as an amorphous white solid with an indefinite melting point at 70°.

2-amino-N,N-dimethylcyclooctanemethylamine

A solution of 12 g. (0.06 mole) of 2-(dimethylaminomethyl)cyclooctanone oxime in 400 ml. of anhydrous ether is added to a suspension of 5.0 g. (0.13 mole) of lithium aluminum hydride in 600 ml. of anhydrous ether with stirring at a rate that maintains a gentle reflux temperature. After remaining overnight at room temperature, the reaction mixture is warmed to gentle reflux with stirring for eight hours, then cooled with an ice-water bath, 25 ml. of water is cautiously added dropwise followed by the dropwise addition of a cold solution of 3 g. of sodium hydroxide in 18 ml. of water. After stirring 30 minutes, the resulting solid which separates from the reaction mixture is allowed to settle and the ethereal solution is decanted. The solid is washed two additional times with ether and the combined ethereal fractions are dried over magnesium sulfate, filtered and the ether is removed by distillation leaving a liquid residue of crude product weighing 10 g. Upon purification by fractionation under reduced pressure, 2 - amino - N,N - dimethylcyclooctanemethylamine distills at 65°–67° at 0.1 mm.

N-(2-dimethylaminomethyl-1-cyclooctyl)benzilamide hydrochloride

A solution of 4 g. (0.022 mole) of 2-amino-N,N-dimethylcyclooctanemethylamine in 40 ml. of anhydrous toluene is cooled with stirring to a reaction temperature of 10–15° as 6.0 g. (0.022 mole) of diphenylchloroacetylchloride (M.P. 48–50°) in 40 ml. anhydrous toluene are added over a period of 30 minutes. During the course of the addition a gummy white solid separates from solution and becomes crystalline as the reaction proceeds. After stirring one hour at room temperature and one hour at 90°, the reaction mixture is allowed to remain overnight at room temperature. The white solid separating from solution is taken up in 200 ml. of a 2% hydrochloric acid solution. The toluene layer is extracted with two 25 ml. portions of water; the combined acidic aqueous solutions are washed with ether, cooled in an ice-water bath and made alkaline by the addition of solid potassium carbonate. The white gummy solid separating from solution is taken up in ether, the ethereal solution is dried over magnesium sulfate, filtered and the ether is removed by distillation, leaving a clear viscous residue of 8.0 g. which solidifies to a glass-like solid at room temperature. The base is taken up in 300 ml. of anhydrous ether, filtered to remove a trace of amorphous solid, cooled in an ice-water bath and acidified to Congo red with a alcoholic hydrogen chloride solution. A white semi-solid separates from solution which readily crystallizes and is recovered by suction filtration, washed with anhydrous ether and dried in a vacuum desiccator to give the crude product. The N - (2 - dimethylaminomethyl-1-cyclooctyl)benzilamide hydrochloride is purified by recrystallization from acetonitrile, M.P. 219–221° d.

EXAMPLE 4

2-dimethylaminomethylcyclooctyl cyclohexylphenylglycolate hydrochloride

2 - dimethylaminocyclooctyl cyclohexylphenylglycolate hydrochloride is prepared by reacting a solution of 9.3 g. (0.05 mole) of 2-(dimethylaminomethyl)cyclooctanol in benzene with 13.5 g. (0.05 mole) of cyclohexylphenylchloroacetyl chloride by the procedure described in Example 1. The product is purified by recrystallization from acetonitrile to give a white crystalline product.

EXAMPLE 5

2-(piperidinomethyl)cyclooctyl phenylcyclopentylacetate

2 - (piperidinomethyl)cyclooctyl phenylcyclopentylacetate is prepared by the procedure described in Example 1 by reacting a solution of 11.9 g. (0.05 mole) of 2-(piperidinomethyl)cyclooctanol in benzene with 11.1 g. (0.05 g.) of cyclopentylphenylacetyl chloride. The product is purified by recrystallization from acetonitrile to give a white crystalline product.

EXAMPLE 6

2-dimethylaminomethylcyclooctyl diphenylethoxyacetate hydrochloride

A solution of 10.2 g. (0.055 mole) of 2-dimethylaminomethylcyclooctanol in 75 ml. of benzene is added dropwise with cooling to a solution of 14.6 g. (0.55 mole) of diphenylchloroacetyl chloride. The mixture is refluxed for three hours when 400 ml. of absolute ethanol are added and the contents refluxed for eight hours. The solvents are removed by distillation. The residue is suspended in water and made alkaline with excess potassium carbonate to liberate the free base. This is taken up in chloroform and dried over anhydrous magnesium sulfate. The chloroform is removed and the residue fractionated to obtain 2-dimethylaminomethylcyclooctyl diphenylethoxyacetate.

The distilled base is dissolved in anhydrous ether and made acid to Congo red with ethereal hydrogen chloride to precipitate the crystalline hydrochloride. Recrystallization from absolute ethanol gives a white crystalline hydrochloride.

EXAMPLE 7

N-(2-dimethylaminomethylcyclooctyl)-N-methylbenzilamide hydrochloride

To 25 g. (0.40 mole) of formic acid (98–100%) are added in portions 27.6 g. (0.15 mole) of 2-amino-N,N-dimethylcyclooctanemethylamine and the solution is refluxed for 10 hours. The excess acid is removed under reduced pressure and the residue is cooled and made alkaline with a solution of 6 g. of sodium hydroxide in 50 ml. of water. The product is extracted with chloroform and dried over magnesium sulfate. After evaporation of the solvent, the residue is fractionated to give 12 grams of a colorless oil. This formyl compound is dissolved in 100 ml. of ether and added dropwise to a cooled suspension of 3.8 g. (0.1 mole) of lithium aluminum hydride in 300 ml. of ether. After the addition, the mixture is refluxed for four hours, cooled and treated dropwise with 6 ml. of ethyl acetate.

The resulting mixture is treated with a solution of 2 g. of sodium hydroxide in 20 ml. of water, stirred for 1 hour and filtered. The filtrate is dried over magnesium sulfate. After evaporation of the solvent, the residue is fractionated to give 8 grams of 2-methylamino-N,N-dimethylcyclooctanemethylamine.

The above amine (8 g.) is reacted with 10.6 g. of diphenylchloroacetyl chloride in the manner described in Example 3 to give N-(2-dimethylaminomethylcyclooctyl)-N-methylbenzilamide hydrochloride as a white crystalline product.

EXAMPLE 8

N-2-dimethylaminomethyl-1-cyclooctyl-o,o'-dichlorobenzilamide hydrochloride

A solution of 4.0 g. (0.22 mole) of 2-amino-N,N-dimethylcyclooctanemethylamine in 40 ml. of anhydrous toluene is reacted with 7.0 g. (0.022 mole) of 2,2-bis(o-chlorophenyl)-2-chloroacetyl chloride as described in the procedure of Example 3 to give a white crystalline product.

EXAMPLE 9

2-dimethylaminomethyl-1-cyclooctyl-o,o'-dichlorodiphenylethoxyacetamide hydrochloride A solution of 4 g. (0.22 mole) of 2-amino-N,N-dimethylcyclooctanemethylamine in 60 ml. of anhydrous benzene is cooled and reacted with 7.0 g. (0.22 mole) of 2,2-bis(o-chlorophenyl)-2-chloroacetyl chloride in 50 ml. of anhydrous benzene. The reaction mixture is then refluxed for 8 hours with 800 ml. absolute ethanol. The solvent is removed under reduced pressure. The residue is recrystallized from acetonitrile to give a white crystalline material.

EXAMPLE 10

N-(2-dimethylaminomethyl-1-cyclooctyl)-p,p'-dimethoxybenzilamide hydrochloride

A solution of 4.0 g. of 2-amino-N,N-dimethylcyclooctanemethylamine in 40 ml. of anhydrous toluene is reacted with 6.9 g. of 2,2-bis(p-methoxyphenyl)-2-chloroacetyl chloride in the manner described in the procedure of Example 3 to give a crystalline material.

EXAMPLE 11

N-(2-dimethylaminomethyl-1-cyclooctyl)-N-o-tolylamide hydrochloride

A solution of 4.0 g. of 2-amino-N,N-dimethylcyclooctanemethylamine in 40 ml. of anhydrous toluene is reacted with 6.8 g. of 2-chloro-2,2-di-o-tolylacetyl chloride in the manner described in the procedure of Example 3 to give a crystalline material.

EXAMPLE 12

2-morpholinomethylcyclooctyl diphenylacetate hydrochloride

Cyclooctanone is reacted with morpholine hydrochloride and formaldehyde to give 2-morpholinomethylcyclooctanone. The ketone is reduced as in the procedure of Example 1. The alcohol is reacted with diphenylacetyl chloride according to the procedure described in Example 1 and the product reacted with one equivalent of hydrogen chloride in anhydrous ethanol as in Example 2 to give a crystalline material.

EXAMPLE 13

N-2-dibenzylaminomethyl-1-cyclooctyl dicyclohexylmethoxyacetamide hydrochloride Cyclooctanone is reacted with dibenzylamine hydrochloride and formaldehyde to give 2-dibenzylaminomethylcyclooctanone. The product is reacted with hydroxylamine hydrochloride as in the procedure described in Example 3. The oxime is reduced as in the procedure described in Example 3. The amine is reacted with α-chlorodicyclohexylacetyl chloride, then refluxed with methanol as in the procedure described in Example 6. The product is treated with one equivalent of hydrogen chloride in anhydrous ethanol to give a crystalline material.

EXAMPLE 14

N-(2-aminomethyl-1-cyclooctyl)dicyclohexylmethoxyacetamide hydrochloride

A solution of 20 g. N-(2-dibenzylamino-1-cyclooctyl) dicyclohexylmethoxyacetamide base in 100 ml. of ethanol is hydrogenated in the presence of 1 g. of 10% platinum on charcoal at 3 atmospheres pressure. When the theoretical amount of hydrogen is taken up, the mixture is filtered and the solvent evaporated. The residue is dissolved in ether and treated with one equivalent of hydrogen chloride in ethanol to give the crystalline product.

EXAMPLE 15

N-[2-(N-benzyl-N-methylaminomethyl)-1-cyclooctyl] dicyclohexylmethoxyacetamide hydrochloride Substituting 2 - (N - benzyl - N - methylaminoethyl) cyclooctanone in the procedure of Example 13 gives the crystalline product.

EXAMPLE 16

N-[2-N-(methylaminomethyl)-1-cyclooctyl]dicyclohexylmethoxyacetamide hydrochloride Substituting N - [2 - (N - benzyl - N - methylaminomethyl) - 1 - cyclooctyl]dicyclohexylmethoxyacetamide base in the procedure of Example 14 gives the crystalline product.

What is claimed is:
1. A compound selected from the group consisting of a base of the formula

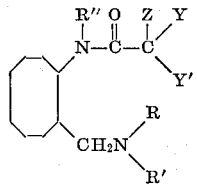

wherein Y and Y' each is 5 to 6 carbon cycloalkyl, Z is a member of the group consisting of hydrogen, hydroxy and lower alkoxy, and R and R' each is a member of the group consisting of hydrogen, lower alkyl, phenyl-lower alkyl and form with the attached nitrogen a 5 to 7 atom heterocyclic of the group consisting of piperidino, (lower alkyl)piperidino, di(lower alkyl)piperidino, (lower alkoxy)piperidino, pyrrolidino, (lower alkyl)pyrrolidino, di(lower alkyl)pyrrolidino, (lower alkoxy)pyrrolidino, morpholino, (lower alkyl)morpholino, di(lower alkyl)morpholino, (lower alkoxy)morpholino, thiamorpholino, (lower alkyl)thiamorpholino, di(lower alkyl)thiamorpholino, (lower alkoxy)thiamorpholino, piperazino, (lower alkyl)piperazino, di(lower alkyl)piperazino, hexamethyleneimino, and homopiperazino, and R" is a member of the group consisting of hydrogen and lower alkyl, and pharmacologically acceptable salt of said base.

2. A compound as in claim 1 wherein R is lower alkyl, R' and R" each is hydrogen, Y and Y' each is 5 to 6 carbon cycloalkyl and Z is lower alkoxy.

3. A compound as in claim 1 wherein R is methyl, R' and R" each is hydrogen, Y and Y' each is 5 to 6 carbon cycloalkyl and Z is methoxy.

4. A compound as in claim 1 wherein R and R' each is phenyl-lower alkyl, R" is hydrogen, Y and Y' each is cyclohexyl and Z is lower alkoxy.

5. A compound as in claim 1 wherein R and R' each is benzyl, R" is hydrogen, Y and Y' each is cyclohexyl and Z is methoxy.

6. A pharmacologically acceptable salt of a compound of claim 2.

References Cited

UNITED STATES PATENTS 3,318,943   5/1967   Greene et al. _____ 260—557

HENRY R. JILES, Primary Examiner

H. I. MOATZ, Assistant Examiner

U.S. Cl. X.R.

260—239, 243, 244, 247.2, 268, 326.85, 544, 999